United States Patent [19]

Holzinger

[11] 4,282,747
[45] Aug. 11, 1981

[54] SYSTEM FOR REGISTERING OPERATING PARAMETERS OF INTERNAL COMBUSTION ENGINES

[75] Inventor: Otto Holzinger, Eschenbach, Fed. Rep. of Germany

[73] Assignee: Robert Bosch GmbH, Stuttgart, Fed. Rep. of Germany

[21] Appl. No.: 126,827

[22] Filed: Mar. 3, 1980

[30] Foreign Application Priority Data

May 21, 1979 [DE] Fed. Rep. of Germany ....... 2920573

[51] Int. Cl.³ ........................................... G01M 15/00
[52] U.S. Cl. ..................................................... 73/116
[58] Field of Search ............... 73/116, 117.3; 364/431, 364/551

[56] References Cited

U.S. PATENT DOCUMENTS 3,960,011  6/1976  Renz et al. ............................. 73/116
4,179,922  12/1979  Bouverie et al. ...................... 73/116

Primary Examiner—Jerry W. Myracle
Attorney, Agent, or Firm—Michael J. Striker

[57] ABSTRACT

A system is disclosed which allows operating parameters of an internal combustion engine to be accurately and speedily determined without tedious readjustment of the engine speed. In one embodiment, a predetermined engine speed is selected at which measurements are to take place. In the second embodiment the measurements are taken at regular intervals within the speed range of the engine.

8 Claims, 2 Drawing Figures

SYSTEM FOR REGISTERING OPERATING PARAMETERS OF INTERNAL COMBUSTION ENGINES

BACKGROUND OF THE INVENTION

This invention pertains to a system which can be used to register operating parameters of an engine, particularly an internal combustion engine, as a function of the engine's operating speed. For example, it may be desirable to graph the dwell angle of the engine's ignition system and other operating parameters as a function of the speed of the engine. Knowledge of such operating parameters as a function of engine speed is greatly to be desired so as to enable other components which may be driven by the engine to be properly designed.

However, it is not an easy task to adjust the engine speed to precisely the speed desired in order to allow accurate measurement to take place. Therefore, when operating characteristics of the engine are to be graphed as a function of engine speed utilizing a plurality of engine speeds in order to draw the graph, an expensive and time-consuming process has previously been necessary.

Thus, it would be desirable to provide a system for registering operating parameters of an engine, particularly of an internal combustion engine, which enables the measurement process to take place in a fast and economical fashion.

SUMMARY OF THE INVENTION

This object, along with others which will become apparent hereinafter, is achieved by connecting a plurality of sensors to the engine and producing at least one parameter signal and a digital speed signal. The number of parameter signals to be produced is equal to the number of operating parameters which are to be measured. The sensors which produce parameter signals are connected to corresponding parameter signal input stages, while the sensor that produces the speed signal is connected to a speed monitor. The engine is then started, and its speed gradually increased. When the speed of the engine as indicated by the speed signal indicates that the engine has reached a speed at which various operating parameters are to be measured, the then-prevailing operating parameters of the engine are registered and held, making them available for subsequent use. Since the whole procedure is accomplished automatically, no time-consuming fine tuning of the engine speed is necessary in order to yield accurate measurements.

In one of the preferred embodiments of the invention, the system is so designed as to automatically register the operating parameters of the engine at regular incremental increases in engine speed. As the registrations take place, they are recorded in an addressable memory in addresses which correspond to the engine speeds at which measurements take place. Then, after the entire operating range of the engine has been traversed and the operating parameters stored in the memory, they can be read out and utilized.

The novel features which are considered as characteristic for the invention are set forth in particular in the appended claims. The invention itself, however, both as to its construction and its method of operaton, together with additional objects and advantages thereof, will be best understood from the following description of specific embodiments when read in connection with the accompanying drawings.

DETAILED DESCRIPTION OF PREFERRED EMBODIMENTS

Figure 1:
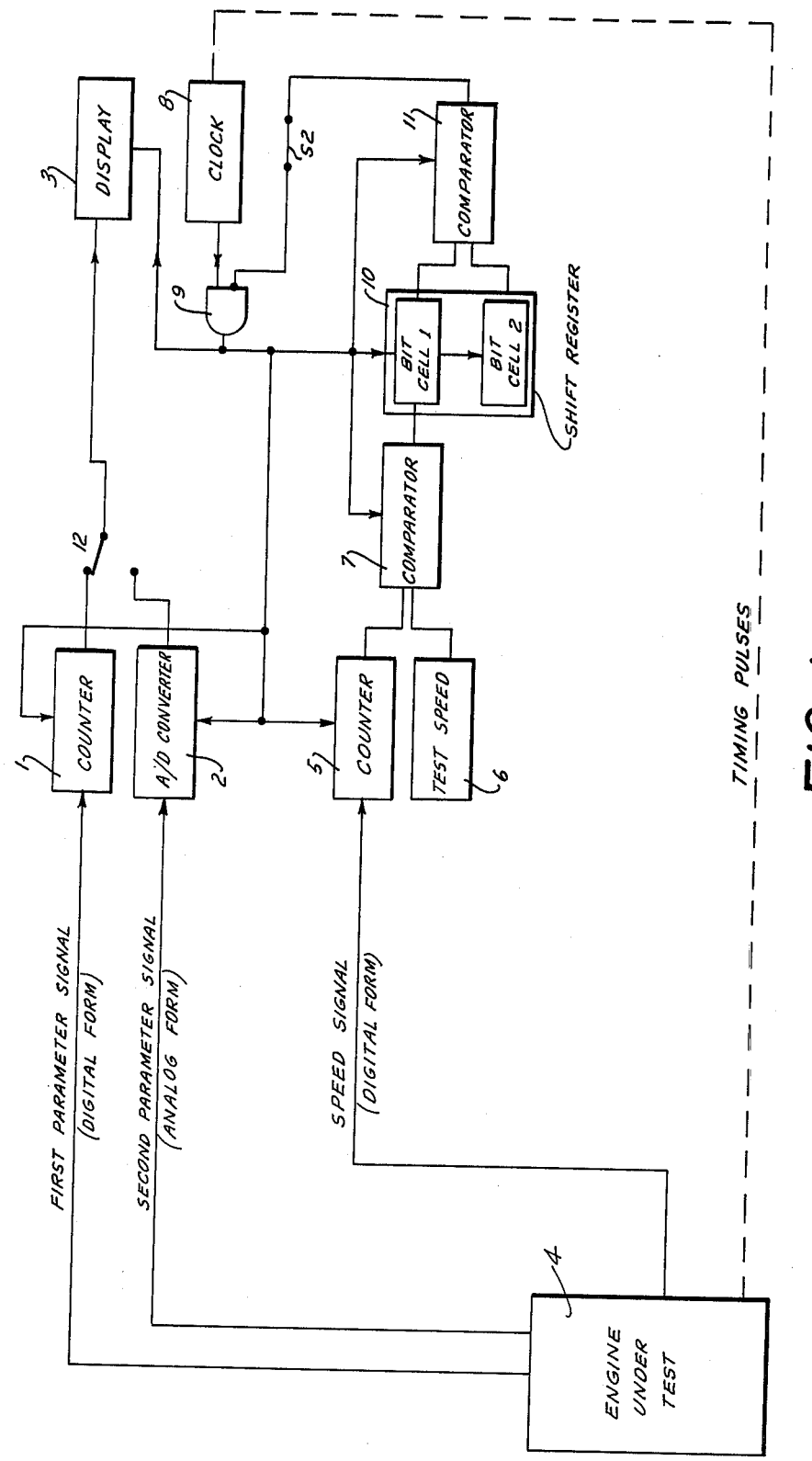
FIG. 1 is a block diagram of a first embodiment of the invention.

Referring first to FIG. 1, it can be seen that a motor 4 which is to be tested produces three electrical signals: a first parameter signal which is produced in digital form, a second parameter signal which is produced in analog form, and a speed signal which is produced in digital form. The first and second parameter signals may be signals representing such operating parameters as dwell angle, and manifold vacuum. However, it will be understood by those skilled in the art that these parmeter signals may be generated by appropriate sensors so as to measure any desired operating parameter of the engine as a function of engine speed.

The speed signal generated by the engine is generated by an appropriate sensor and represents the engine speed in revolutions per minute at which the engine is operating.

The first parameter signal is routed to a counter 1, while the second parameter signal is routed to an analog-to-digital converter 2 and the speed signal is routed to a counter 5. The entire system is clocked by clock 8, as will be seen hereinafter. It will be apparent to those skilled in the art that single pole double throw switch 12 can connect a display unit 3 to either counter 1 or analog-to-digital converter 2 so as to display the contents of either one of these parameter signal input stages.

A test speed control 6 can be adjusted by a user to correspond to any test speed at which it is desired measurement of operating parameters of the engine 4 is desired. Counter 5 and test speed control 6 are both connected to comparator 7. Comparator 7 produces a logically low output signal when the contents of counter 5 are less than the corresponding contents of the test speed control 6. However, when the contents of counter 5 are the same as the contents of the test speed control 6 and the desired engine speed has thus been reached, the comparator 7 can then produce a logically high output which is routed to shift register 10.

Shift register 10 contains two bit cells which are each connected to another comparator 11. When both bit cells in shift register 10 contain identical contents, comparator 11 produces a logically low output. However, when the contents of the bit cells of shift register 10 are not equal to each other, comparator 11 produces a logically high output.

Counter 1, analog-to-digital converter 2, counter 5, comparator 7, shift register 10, comparator 11, and display 3 are all clocked by the clock 8 which acts through AND-gate 9. Clock 8 is connected to a non-inverted input of AND-gate 9, while comparator 11 is connected to an inverting input of AND-gate 9. The output of AND-gate 9 is routed to all the components which are clocked.

In use, the engine 4 is started and the various parameter signals and the speed signal are made available to counter 1, analog-to-digital converter 2, and counter 5. Since at initial engine speeds the contents of counter 5 will be less than the contents of the test speed control 6, comparator 7 will produce a logically low output signal which will be shifted into both bit cells of the shift register 10 as the clock pulses generated by clock 8 are received. Each time that a clock pulse from clock 8 is received by the various components, the contents of counter 1, analog-to-digital converter 2 and counter 5 are updated in order to reflect the then-current signals introduced to these components. Meanwhile, the display 3 displays the contents of either the counter or the analog-to-digital converter 2, depending upon the position to which switch 12 has been set.

As the speed of the engine 4 is increased, there will eventually come a point at which the engine 4 reaches a speed at which a measurement of the various operating parameters of the engine 4 is to take place. At this point, which occurs when the contents of the counter 5 at least equal the value of the test speed control 6, the comparator 7 will produce a logically high output signal and the next clock pulse will cause the first bit cell in shift register 10 to become logically high, while the second bit cell remains logically low. At this point, comparator 11 produces a logically high output signal, which causes the output of AND-gate 9 to be logically low regardless of the clock pulses generated by clock 8. Thus, no further clock pulses are transmitted to any of the other components in the system. At this point, the counter 1, analog-to-digital converter 2 and counter 5 remain at their most recently updated values, and the desired operating parameters of the engine 4 can be read off display 3. Display 3 will accurately reflect the various operating parameters because the contents of counter 1 and analog-to-digital converter 2 will be those which existed at the time the AND-gate 9 was shut down by a logically high output signal from comparator 11. After the contents of counter 1 and analog-to-digital converter 2 have been read off display 3, the entire system can be reset by suitable circuitry (not shown), the test speed control 6 can be reset to the next engine speed at which measurements of operating parameters is desired, and the entire process can be repeated as many times as are necessary. If desired, the clock 8 can be connected to the engine 4 so as to be synchronized thereby. Shift register 10 and comparator 11 are provided to shut down AND-gate 9 when the point of measurement due to the speed set with speed control 6 is passed as the speed of the engine 4 increases or decreases. To this end, engine 4 may be equipped with a suitable additional sensor so as to generate timing pulses at the dead point of the engine on each revolution of the crank shaft. This arrangement is advantageous when the operating parameters of the engine's ignition system are to be measured.

Figure 2:
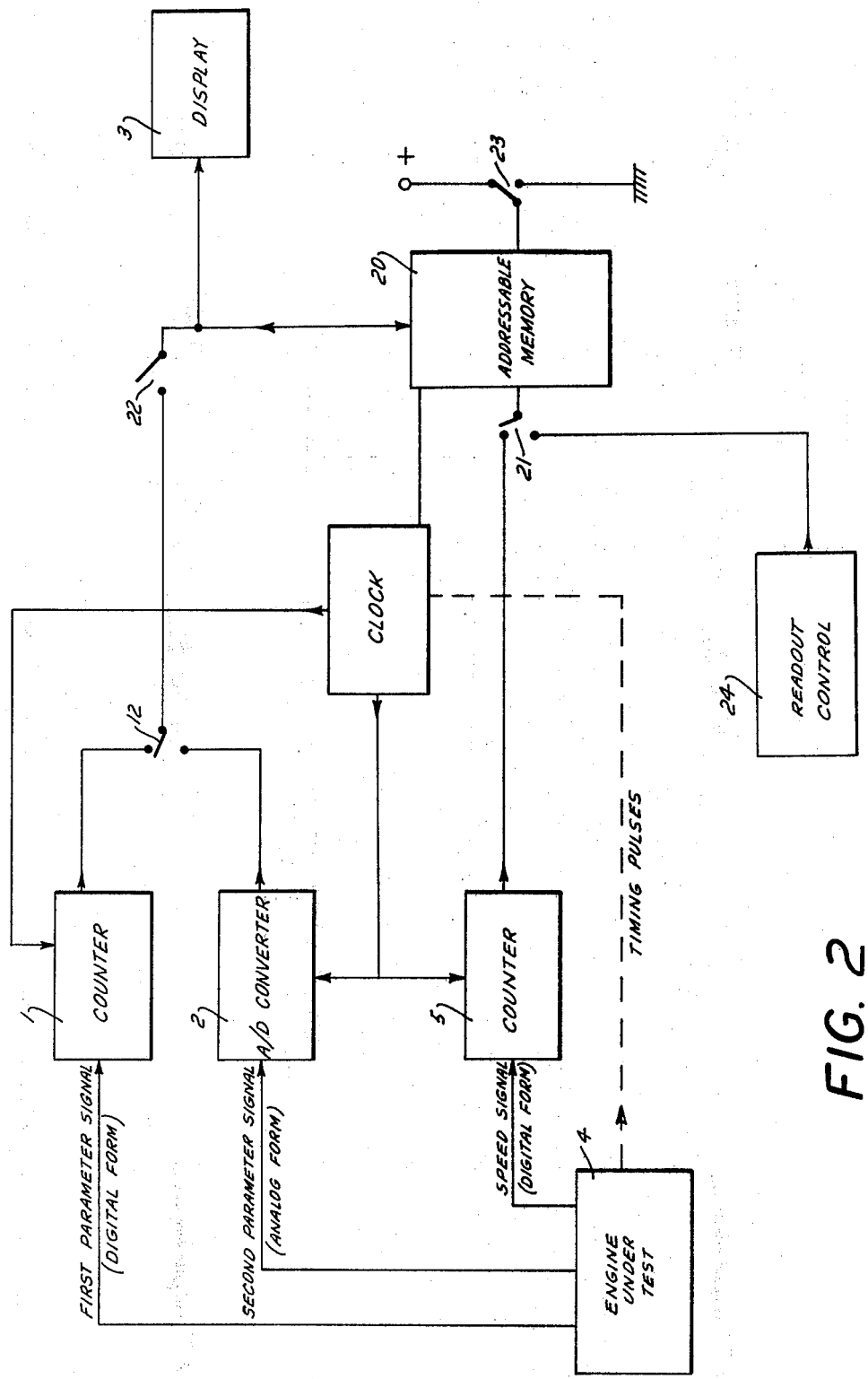
FIG. 2 is a block diagram of second embodiment of the invention.

Referring now to FIG. 2, it can be seen that engine 4, counter 1, analog-to-digital converter 2 and counter 5 are all connected as before and are all clocked by clock 8. A display 3 can also be connected to read the contents of counter 1 and analog-to-digital converter 2 by suitable positioning of single pole double throw switch 12.

However, this second embodiment of the invention is provided with a clocked, addressable memory 20. When single pole double throw switch 21 is in the position shown, the contents of counter 5 can be used to define the address within memory 20 to which information registered in the counter 1 or analog-to-digital converter 2 is routed and stored. Such storage, of course, can only occur when single pole throw switch 22 is closed.

However, counter 5 is so constructed that it only responds incrementally to changes in speed of the engine 4. For example, counter 5 can be so connected that it only registers engine speed in increments of 50 revolutions per minute. Thus, the counter 5 will produce a discrete stepped output which is used to address the memory 20 as the speed of the engine 4 is increased. When single pole double throw switch 23 connects the appropriate terminal of memory 20 to power, the memory can be utilized to store information generated by either counter 1 or analog-to-digital converter 2. After the engine has been started and its speed gradually increased, each increase of 50 revolutions per minute will cause the various operating parameters of the engine to be sampled for storage in the addressable memory 20. Although the embodiment shown in FIG. 2 only causes the values of one of the first and second parameter signals to be stored in the memory 20, those skilled in the art will readily understand that the memory 20 can be so manufactured and connected to counter 1 and analog-to-digital converter 2 that the values of all parameter signals can be stored in the memory 20.

After the speed of the engine 4 has been increased sufficiently, the memory 20 will contain data representing either the first parameter signal or the second parameter signal, depending upon the position to which switch 12 was thrown. Moreover, this data will be arranged inside the memory as a function of the speed of the engine 4. After the entire test has been run, and the relevant operating range of the engine 4 properly tested, switch 22 may be opened and switch 23 may be thrown to connect the paper terminal of memory 20 to ground. Switch 21 can then be thrown to connect the addressable memory 20 to a user-adjustable readout control 24.

At this point, the readout control 24 can be operated so as to cause the contents of memory 20 to be displayed on display 3 as a function of the addresses addressed by readout control 24. Thus, the operating parameters of the engine 4 can be read out as a function of engine speed. As before, clock 8 may be synchronized with the engine 4 by virtue of timing pulses derived from operation of the engine 4, so that operating parameters of the engine's ignition system can be plotted as a function of engine speed.

As shown in these embodiments, information is transferred in serial form. Thus, only one data line between successive elements has been shown. However, in the event that data in parallel form is utilized, a plurality of data lines can be used.

Without further anaylsis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for registering operating parameters of an engine when a suitable engine test speed has been reached and when the engine is provided with at least one sensor which produces a parameter signal and is further provided with a sensor that produces a digital speed signal, comprising: at least one parameter signal input stage, each such parameter signal input stage being associated with and being responsive to a parameter signal so as to bring all parameter signal input stages and all parameter signals into one-to-one correspondance with each other, each parameter signal input stage operating in a manner that it registers its corresponding input signal upon receipt of a clock pulse and retains such registration until updated by a subsequent clock pulse; a speed monitor responsive to the speed signal, the speed monitor operating in a manner that it registers the speed signal upon receipt of a clock pulse and retains such registration until updated by a subsequent clock pulse; a user-adjustable test speed control, the test speed control operating in a manner that the test speed control can be adjusted by a user to register a test speed at which engine parameters are to be measured; a comparator connected to the speed monitor and the test speed control, the comparator producing a logically high output signal when a speed registered by the speed monitor at least equals the test speed registered by the test speed control and producing a logically low output signal otherwise; a clock producing a train of clock pulses; and a switch connected to the clock, the comparator, all parameter signal input stages and the speed monitor, the switch permitting clock pulses produced by the clock to be received by all parameter signal input stages and the speed monitor when the comparator produces a logically low output signal and preventing clock pulses produced by the clock from being received by all parameter signal input stages and the speed monitor otherwise.

2. The system defined by claim 1, further including a display which is connectable to any one of the parameter signal input stages and which operates in a manner that the display displays any signal registered in a parameter signal input stage to which the display is connected.

3. The system defined by claim 2, wherein the clock is connected to the engine and operated in a manner that the clock responds to timing pulses generated by the engine.

4. A system for registering operating parameters of an engine at regular intervals within a range of engine operating speeds when the engine is provided with at least one sensor which produces a parameter signal and is further provided with a sensor that produces a digital speed signal, comprising: at least one parameter signal input stage, each such parameter signal input stage being associated with and being responsive to a parameter signal so as to bring all parameter signal input stages and all parameter signals into one-to-one correspondance with each other, each parameter signal input stage operating in a manner that it registers its corresponding input signal upon receipt of a clock pulse and retains such registration until updated by a subsequent clock pulse; a speed monitor responsive to the speed signal, the speed monitor operating in a manner that it registers the speed signal upon receipt of a clock pulse and retains such registration until updated by a subsequent clock pulse; a clocked addressable memory connected to all parameter signal input stages and the speed monitor, the memory operating in a manner that the signals registered in the parameter signal input stages are stored in the memory at locations corresponding to speeds of the engine when the signals registered in the parameter signal input stages are so registered; and a clock producing a train of clock pulses, the clock being connected to all parameter signal input stages, the speed monitor, and the memory.

5. The system defined by claim 4, wherein the system further includes a display connected to the memory and connectable to any of the parameter signal input stages.

6. The system defined by claim 5, further including a user-adjustable readout control connected to the memory and operating in a manner that when the readout control is adjusted by a user, the memory can be addressed and the signals stored therein can be read out to the display.

7. The system defined by claim 5, wherein the speed monitor operates in a manner that the speed signal registered therein is updated in predetermined increments of speed.

8. The system defined by claim 7, wherein the clock is connected to the engine and operates in a manner that the clock responds to timing pulses generated by the engine.

* * * * *